Patented Feb. 10, 1942

2,272,711

UNITED STATES PATENT OFFICE 2,272,711

CATALYTIC DEHYDROGENATION OF TERPENES TO PARA-CYMENE

Washington Hull, Darien, Conn., assignor to American Cyanamid Company, New York, N. Y., a corporation of Maine No Drawing. Application February 4, 1939, Serial No. 254,597

6 Claims. (Cl. 260—668)

This invention relates to the production of p-cymene by dehydrogenation of monocyclic terpenes such as dipentene, limonene, terpinolene, terpinenes as well as p-menthenes, p-menthane and the like in the presence of a new class of catalysts adapted to produce a purer product.

The dehydration and dehydrogenation of monocyclic terpenes and mixtures containing them, such as pine oil or pine oil fractions containing terpineol and the like is well known. The reaction is a simple dehydration and dehydrogenation, and can be made to take place in the vapor phase at reaction temperatures of 250-325° C. by passing vapors of the compounds over the catalyst. Such catalysts as fuller's earth, kieselguhr and aluminum oxide have been used for this purpose, as well as activated carbon containing no free metal. Yields of p-cymene, using catalysts of this type, have varied from 50 to 70% and further purification of the product, which is quite difficult, has always been necessary.

I have now found that dipentene and similar monocyclic terpenes can be dehydrogenated in the vapor phase at temperatures as low as 260-275° C. in the presence of a catalyst comprising palladium on a carrier of high surface activity. In the presence of this catalyst monocyclic terpenes such as dipentene are almost completely converted to a water-white product containing 95-99% p-cymene. These results are quite remarkable when compared with those obtained with other catalysts, for the product requires no further purification before use.

My invention, therefore, comprises the process of dehydrogenating monocyclic terpenes such as dipentene by vaporizing them and passing the vapors over a palladium catalyst supported on a carrier having high surface activity, such as activated carbon, activated alumina or silica gel and the like. For example, I have succeeded in converting dipentene to a product containing 98-99% p-cymene and only 0.8% of p-menthane by passing the diepentene vapors at 275° C. over a catalyst consisting of palladium supported on activated carbon. Similar results are obtained with palladium supported on activated alumina, and in both cases a product is obtained which can be used directly for nitration, sulfonation or other treatment without preliminary purification.

The monocyclic terpenes which constitute the starting materials may be obtained from any suitable source. Thus, for example, they may be obtained from the isomerization of alpha-pinene, which is obtained from sulfate turpentine produced as a by-product in the sulfate digestion of coniferous woods for the manufacture of paper pulp. Alpha-pinene may be isomerized in the liquid or vapor phase, and vapors of the resulting monocyclic terpenes may then be passed directly over the catalysts constituting a feature of the present invention for the production of p-cymene. Alternatively, dipentene or other monocyclic terpenes may be vaporized at 180-220° C. and the vapors passed directly over the catalyst.

The invention will be illustrated in greater detail by the following specific examples. It should be understood, however, that these examples are given primarily by way of illustration and that the invention in its broader aspects is not limited thereto.

Example 1

54 parts by weight of activated carbon are heated with 100 parts of water to 50° C. At this temperature a solution of 5 parts of palladium chloride in about 300 parts of water is slowly added with continuous agitation of the carbon. The agitation is continued for about 2 hours at 50° C. while a vigorous stream of hydrogen is passed through the mixture. The catalyst is then filtered with suction and dried at 110° C.

The catalyst is introduced into a converter provided with suitable means for temperature regulation, such as a jacket containing a boiling or non-boiling bath provided with heating means and heated to about 275° C. A tubular converter having nickel tubes 0.8 inch in diameter has been used with good results. Dipentene is vaporized into this converter and passed over the catalyst at the rate of 60-64 cc. of liquid dipentene vaporized per hour per 240 cc. of catalyst. A colorless converter product is obtained containing less than 1% of terpenes, 0.4-1.6% p-menthane, having a specific gravity of $$D_D^{20} = 0.8430$$

to 0.8546 and refractive index $$N_D^{20} = 1.4835 \text{ to } 1.4865$$

indicating a content of 98-99% p-cymene. The hydrogen given off was about 99% pure. Yields of 95% were obtained.

Example 2

204.2 parts by weight of activated alumina gel, of the type sold commercially by the Aluminum Corporation of America, was screened to 8-12 mesh and heated in a revolving coating pan. 10 parts by weight of palladium chloride were dissolved in 1500 parts of water containing 15 parts of 50% hydrochloric acid and the solution was sprayed on the heated activated alumina. A catalyst consisting of activated alumina uniformly coated with a red-brown layer of palladium chloride was obtained.

The catalyst was heated to 400–420° C. in a container resistant to hydrochloric acid and reduced with a stream of hydrogen for 1.5 hours. Complete reduction was indicated by a change in color of the catalyst, which became almost black when the palladium chloride was completely reduced.

The catalyst was filled into the converter described in Example 1 and vapors of dipentene were passed through it. A converter product was obtained which analyzed better than 95% p-cymene and which was water-white in color and suitable for immediate use.

This catalyst is particularly well suited for large scale commercial production by reason of its ease of regeneration. It can be reactivated in situ by oxidation with air to burn out any organic deposits which would cause fouling and then reduced with hydrogen at 300–450° C., and the pure hydrogen given off by the dehydrogenation of the dipentene may be used for this purpose.

What I claim is:

1. A process of producing p-cymene which comprises passing vapors of a monocyclic terpene at dehydrogenation temperatures over a catalyst containing palladium supported on a carrier having high surface activity.

2. A process of producing p-cymene which comprises passing vapors of dipentene at dehydrogenation temperatures over a catalyst containing palladium supported on a carrier having high surface activity.

3. A process of producing p-cymene which comprises passing vapors of a monocyclic terpene at dehydrogenation temperatures over a catalyst containing palladium supported on activated carbon.

4. A process of producing p-cymene which comprises passing vapors of dipentene at dehydrogenation temperatures over a catalyst containing palladium supported on activated carbon.

5. A process of producing p-cymene which comprises passing vapors of a monocyclic terpene at dehydrogenation temperatures over a catalyst containing palladium supported on activated alumina.

6. A process of producing p-cymene which comprises passing vapors of dipentene at dehydrogenation temperatures over a catalyst containing palladium supported on activated alumina.

WASHINGTON HULL.